United States Patent [19]

Hamamatsu

[11] 4,328,738
[45] May 11, 1982

[54] VACUUM SERVO BOOSTER

[75] Inventor: Seiji Hamamatsu, Tokyo, Japan

[73] Assignee: Tokico Ltd., Kawasaki, Japan

[21] Appl. No.: 77,370

[22] Filed: Sep. 20, 1979

[30] Foreign Application Priority Data

Sep. 20, 1978 [JP] Japan .......................... 53-128822[U]
Sep. 20, 1978 [JP] Japan .......................... 53-128825[U]
Sep. 29, 1978 [JP] Japan .......................... 53-133801[U]
Sep. 29, 1978 [JP] Japan .......................... 53-133802[U]

[51] Int. Cl.³ ........................ F15B 9/10; F01B 19/00; F16J 3/02
[52] U.S. Cl. .................................. 91/376 R; 92/99; 92/165 PR; 92/166
[58] Field of Search .......... 92/166, 99, 98 D, 165 PR; 91/369 R, 369 A, 369 B, 376 R; 60/547 R

[56] References Cited

U.S. PATENT DOCUMENTS

| | | | |
|---|---|---|---|
| 2,974,646 | 3/1961 | Miller et al. | 92/166 |
| 2,980,068 | 4/1961 | Stelzer | 91/369 B |
| 2,989,035 | 6/1961 | Stelzer | 91/369 B |
| 3,082,744 | 3/1963 | Gardner | 91/369 A |
| 3,143,927 | 8/1964 | French et al. | 91/369 A |
| 3,411,409 | 11/1968 | Bunyard | 92/166 |
| 3,537,358 | 11/1970 | Bunyard | 92/166 |
| 4,270,353 | 6/1981 | Thomas et al. | 92/165 PR |

FOREIGN PATENT DOCUMENTS

| | | | |
|---|---|---|---|
| 2306630 | 9/1974 | Fed. Rep. of Germany | 92/165 PR |
| 2009871 | 6/1979 | United Kingdom . | |

Primary Examiner—Paul E. Maslousky
Attorney, Agent, or Firm—Wenderoth, Lind & Ponack

[57] ABSTRACT

A vacuum servo booster device includes a housing defined by a front shell and a rear shell, a valve body slidably supported by the rear shell and incorporating therein a valve mechanism, a flexible diaphragm connected to the circumference of the valve body and extending in the radial direction toward the outer circumference of the housing to divide the interior of the housing into a front chamber and a rear chamber, and a piston plate mounted around the valve body and extending contiguous to the diaphragm. The improvement is constituted by at least one rigid connecting rod extending through both chambers and the piston plate and slidingly and sealingly through the diaphragm with the opposite ends thereof being connected to respective shells.

1 Claim, 8 Drawing Figures

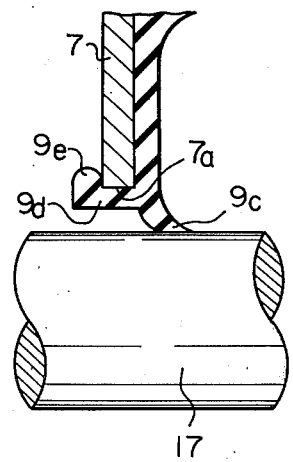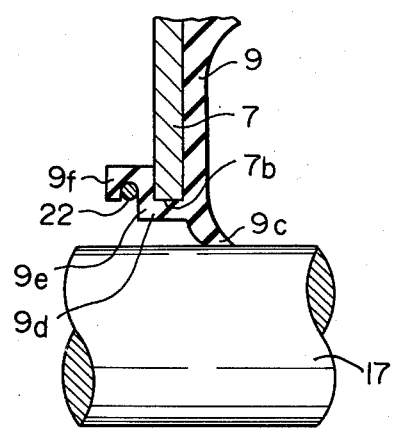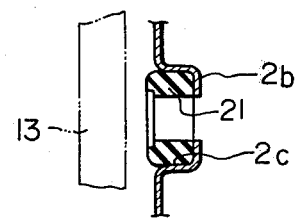

4,328,738

VACUUM SERVO BOOSTER

BACKGROUND OF THE INVENTION

This invention relates to vacuum servo booster devices such as vacuum servomotors or the like, which are particularly adapted for use in hydraulic braking system of a vehicle.

Conventional vacuum servomotors comprise a housing defined by a front shell and rear shell, a valve body slidably supported by the rear shell and incorporating therein a valve mechanism, a flexible diaphragm connected to the circumference of the valve body and extending in the radial direction toward the circumference of the housing so as to divide the interior of the housing into a front chamber and a rear chamber, and a piston plate mounted on the valve body and extending contiguous to the diaphragm. When a vacuum servomotor of the aforesaid kind is used in a vehicle hydraulic braking system, a master cylinder is rigidly secured to the front shell by means of bolts or the like, and the rear shell of the servomotor is rigidly connected to a toe-board (a plate partitioning a driver's compartment from an engine) in accordance with usual practice. In such a case, the housing of the servomotor must receive the force acting on the master cylinder. When the strength and rigidity of the housing of the servomotor are insufficient, there have been problems such that the housing of the booster is deformed, or that the effective stroke of the booster or the master cylinder is reduced, or the like.

It is possible to overcome these afore-mentioned problems by increasing the cross-sectional width of the shells which constitute the housing, however, this solution creates problems such that the weight of the booster increases and that the amount of the material needed for fabricating the housing also increases.

SUMMARY OF THE INVENTION

An object of the present invention is to provide a novel pneumatic force multiplying device solving the aforementioned problems. According to the invention, the pneumatic force multiplying or servo booster device further comprises at least one rigid connecting rod extending through the front and rear chambers, and the piston plate, and slidingly and sealingly through the diaphragm. The opposite ends of the connecting rod are connected to respective shells.

Preferably, two or more connecting rods are positioned in an equally spaced relationship both in the radial and circumferential directions with respect to the longitudinal axis of the device.

BRIEF DESCRIPTION OF THE DRAWINGS

These and other objects and advantages of the invention will be clear from the foregoing and a reading of the ensuing specification in conjunction with the accompanying drawings which exemplify the preferred and several other embodiments of the present invention, in which:

FIG. 6 is an enlarged partial view showing a portion of FIG. 3;

FIG. 7 is a view similar to FIG. 6 but showing a modified form of the present invention; and FIG. 8 is a partial sectional view showing a seal member.

DETAILED DESCRIPTION OF THE PREFERRED EMBODIMENT

Figure 1:
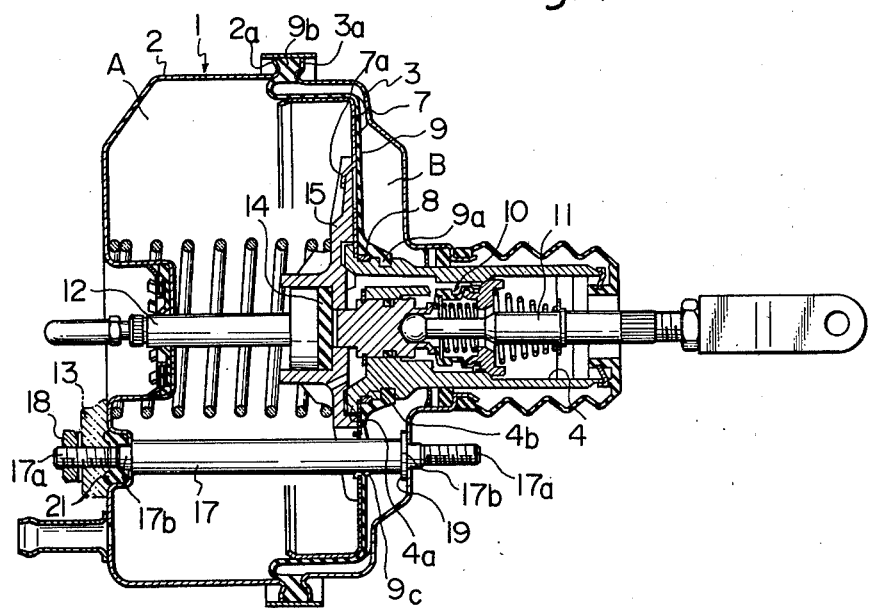
FIG. 1 is a longitudinal sectional view of a pneumatic force multiplying device according to the invention.
Figure 2:
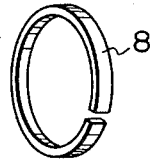
FIG. 2 is a perspective view of a C-ring utilized in the device of FIG. 1.

The pneumatic force multiplying or servo booster device illustrated in FIG. 1 comprises a housing defined by a front shell 2 and a rear shell 3, and a valve body 4 slidingly supported by the rear shell 3. The valve body 4 has a flange portion 4a on the front end thereof, and an annular groove 4b which is spaced from the flange portion 4a by a predetermined distance. A generally dish-like shaped piston plate 7 having a central opening therein is mounted on the valve body 4 with the inner circumferential portion of the opening thereof being clamped between the flange portion 4a and a C-shaped ring 8 (FIG. 2) which is fitted in the annular groove 4b. A flexible diaphragm 9 is bonded to the rear surface of the piston plate 7 with an inner circumferential portion 9a tightly fitting to the outer circumference of the valve body 4, and the an outer circumferential portion 9b is clamped between flange portions 2a and 3a of respective shells 2 and 3. The diaphragm 9 divides the interior of the housing into a front chamber A and a rear chamber B. The valve body 4 incorporates therein a valve mechanism 10 for effecting the force multiplying action of the device. For actuating the valve mechanism 10 there is provided an input rod 11 which is retained in the valve body 4, and the rear end which projects from the valve body, is adapted to be connected to a brake pedal (not shown) or the like. An output rod 12 projects through the front wall of the front shell 2 and is adapted to be connected to a piston or the like of a master cylinder (not shown) which is connected to the front shell 2 through a spacer 13. The rear end of the output rod 12 is slidably received in a disc holder 15 and receives therefrom the output force of the device through an elastic disc 14. The disc holder 15 is secured to the piston plate 7 by means of a plurality of circumferentially spaced pawls 7a which are formed on the piston plate 7 by a method such as a cutting and bending operation whereby the pawls 7a respectively engage the outer circumference of the disc holder 15. Thus, the valve body 4, the diaphragm 9, the piston plate 7 and the disc holder 15 constitute an integral sub-assembly.

According to the invention, there are provided three connecting rods 17 which are symmetrically spaced both in the radial and circumferential directions with respect to the longitudinal axis of the device (only one rod 17 is shown in FIG. 1). Each connecting rod 17 extends through the front shell 2, the piston plate 7, the diaphragm 9 and the rear shell 3. A reduced diameter portion 17a having a threaded portion on the outer end thereof is formed on each end of the connecting rods 17, and an outwardly facing shoulder 17b is positioned on the rod between a reduced diameter portion 17a and the main body portion of the connecting rod 17. The reduced diameter portion 17a outwardly extends from the front end of each of the connecting rods 17, through an opening formed in the front shell 2 and through the spacer 13. A nut 18 threadably engages the threaded portion of the connecting rod 17 thereby securing the spacer 13 to the front shell 2. In the embodiment, the master cyliner (not shown) is fixedly supported on the spacer 13. On the rear end of each connecting rod 17, the reduced diameter portion 17a extends through an opening formed in the rear shell 3 and through an opening formed in a toe-board (not shown) of a vehicle, and threadably engages a nut (not shown), thus, the rear shell 3 is rigidly connected to the toe-board, whereby the pneumatic force multiplying device and the master cylinder are rigidly mounted on a chasis member of the vehicle. The connecting rod 17 extends through respective openings formed in the piston plate 7 and the diaphragm 9 which partition the chambers A and B. A lip seal 9c is integrally formed on the diaphragm 9 to sealably and slidably engage the connecting rod 17. On the front end of the connecting rod 17 there is provided an annular seal member 21 which seals the outside the chamber A, which is shown as a vacuum chamber in the embodiment, from the ambient. On the rear end of the connecting rod there is provided a washer 19 which is welded on the inner wall of the rear shell 3 to tightly engage the shoulder 17b of the connecting rod to seal the chamber B. If desired, a suitable gasket or the like may be provided between the shoulder 17b and the washer 19.

In operation, the input rod 11 moves forward in response to the depression of a brake pedal (not shown), the valve mechanism 10 is actuated to, firstly, discontinue the communication between the chambers A and B and, to, secondly, communicate the chamber B with the atmosphere. Thus, a differential pressure is generated across the piston plate 7 and the diaphragm 9 and, the piston plate 7, the diaphragm 9, the valve body 4 and the disc holder 15 integrally move forward whereby a multiplied force is transmitted through the output rod 12 to the master cylinder. The reaction of the force in the output rod is transmitted to the input rod 11 through the elastic disc 14. The reaction of the force generated in the master cylinder is transmitted through the connecting rods 17 to the chasis member of the vehicle and not through the front and rear shells 2 and 3.

Figure 3:
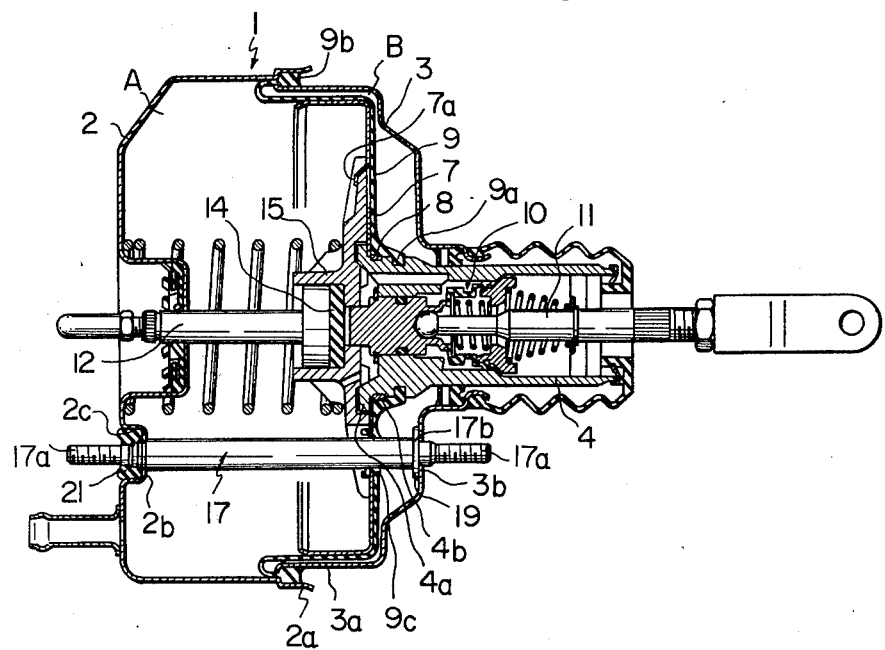
FIG. 3 is a longitudinal sectional view of a second embodiment of the invention.
Figure 4:
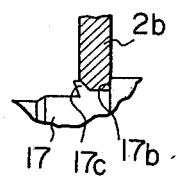
FIG. 4 is an enlarged partial view showing a portion of FIG. 2.

The embodiment shown in FIGS. 3 and 4 is generally similar to the first embodiment and, corresponding numerals have been applied to corresponding parts.

Figure 5:
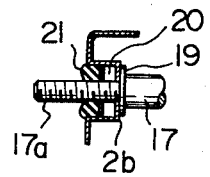
FIG. 5 is a view similar to FIG. 4 but showing a modified form of the present invention.

The connecting rods 17 are integrally connected to the front shell 2 as shown in FIG. 4. Specifically, the shoulder 17b on the forward end of each of the connecting rods 17 is tightly pressed against the inner wall of a portion 2b surrounding the opening of the front shell 2 by forming a projection 17c under a caulking process or the like. Alternatively, the caulking process may be substituted by a nut 20 threadably engaged with the connecting rod 17 as shown in FIG. 5. The connecting rods 17 of the embodiment of FIG. 3 further act to tightly connect the front and rear shells 2 and 3, specifically, the outer circumferential portion 9b of the diaphragm 9 is simply clamped between the end portions 2a and 3a of the front and rear shells 2 and 3. Thus it is possible to omit conventional connecting ring such as shown in FIG. 1, thereby reducing the outer diameter of the device.

Since the connecting rods 17 are integrally connected to the front shell 2, the assembling of the booster including the assembling of the shells can be performed very easily.

Alternatively, the connecting rods are integrally secured to the rear shell 3 and releasably connected to the front shell 2.

FIG. 6 shows detailed construction of the lip portion 9c of the diaphragm 9 in the embodiments of FIGS. 1 and 3.

An annular lip portion 9c integrally formed on the diaphragm 9 slidingly and sealingly engages the connecting rod 17. A bore 7b is formed in the piston plate 7 for allowing the connecting rod 17 to freely pass therethrough. The diaphragm 9 further has a sleeve-like portion 9d extending through the bore 7b which tightly engages with the inner circumference of the bore 7b, and a flange-like portion 9e extends radially outward from the sleeve-like portion 9d for engaging the surface portion of the piston plate 7 surrounding the bore 7b. The sleeve-like portion 9d and the flange-like portion 9e constitute a retaining portion for retaining the lip portion 9c in its proper position with respect to the piston plate 7, thus assuring aforementioned sealing characteristics of the lip portion 9c.

FIG. 7 shows a modified form, in which, the flange-like portion 9e of the diaphragm 9 is modified to define an annular recess 9f for receiving therein an annular resilient ring 22, whereby the retaining portion of the diaphragm 9 is reliably retained on the piston plate 7, and thus the relative position of the lip portion 9c and the piston plate 7 can be reliably maintained.

In the embodiments of FIGS. 6 and 7, the flange-like portion 9e of the diaphragm may not necessarily have an annular configuration.

FIG. 8 shows the details of the seal member 21 in the embodiment of FIG. 1. As shown in FIG. 8, a recessed portion 2c is formed in the front shell 2, and the seal member 21, received in the recessed portion 2c, has an axial length larger than the depth of the recessed portion 2c. Thus, when the reduced diameter portion 17a of the connecting rod 17 is inserted through the front shell 2, the seal member 21 and the spacer 13, and the nut 18 is tightly applied, the front shell 2 and the spacer 13 are tightly connected and the seal member 21 assures the seal.

As described heretofore in detail, the pneumatic force multiplying device according to the invention comprises a rigid connecting rod extending through the front and rear shells with the opposite ends thereof being connected to respective shells, thus, it is possible to prevent the deformation of the shells thereby maintaining desired characteristics during long periods of usage.

Further, since the force acting on the shells can substantially be reduced, the shells may be formed of a thinner material than that of the conventional shells and, further, the shells can be made of a synthetic resin or the like, thus further reducing the fabricating cost of the booster.

Further, the front and rear shells are connected by the connecting rod, thus, it is possible to omit the connecting means, such as the connecting ring shown in FIG. 1, or the like, and thus the assembling operation can be performed easily and economically.

What is claimed is:

1. A vacuum servo booster device comprising:
a housing having a front and rear shell;
a valve body slidably supported by said rear shell and having a valve mechanism therein;
a flexible diaphragm connected to a circumferential surface of said valve body and radially extending to and connected to a circumferential surface of said housing, said diaphragm dividing the interior space of said housing into a front and rear chamber;

a piston plate mounted around said valve body and extending contiguously with said diaphragm, said piston plate having one side abutting said diaphragm, said said piston plate having a bore therethrough;

at least one rigid connecting rod extending through the front and rear chambers and slidably extending through said bore, the opposite ends of said rod respectively connected to the front and rear shells;

said diaphragm having an integral lip portion extending radially inwardly from the peripheral surface of said bore for sealingly and slidably engaging said connecting rod; and said lip portion having an integral retaining portion, said retaining portion including an integral sleeve and an integral flange, said sleeve axially extending from said one side of said piston plate and through said bore and to the other side of said piston plate, said integral flange extending radially outwardly from said sleeve and abutting the other side of said piston plate for fixedly positioning said lip portion relative to said piston plate.

* * * * *